United States Patent
Ozaki (10) Patent No.: US 6,557,595 B2
(45) Date of Patent: May 6, 2003

(54) REFUELING CONTROL VALVE AND FUEL TANK DEVICE HAVING THE SAME

(75) Inventor: Katsunori Ozaki, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/891,333

(22) Filed: Jun. 27, 2001

(65) Prior Publication Data

US 2001/0054452 A1 Dec. 27, 2001

(30) Foreign Application Priority Data

Jun. 27, 2000 (JP) .................................. 2000-192876

(51) Int. Cl.[7] .............................................. B65B 1/04
(52) U.S. Cl. ...................... 141/301; 141/198; 220/86.2; 137/202
(58) Field of Search ................................. 141/301, 302, 141/198, 95, 286, 349, 350; 220/86.2; 137/202, 43

(56) References Cited

U.S. PATENT DOCUMENTS

| | | | | |
|---|---|---|---|---|
| 4,094,346 A | * | 6/1978 | Milo | 137/202 |
| 4,807,656 A | * | 2/1989 | Ito | 137/43 |
| 6,062,276 A | * | 5/2000 | Benjey et al. | 137/202 |
| 6,250,325 B1 | * | 6/2001 | Kim | 137/38 |

FOREIGN PATENT DOCUMENTS

JP  09-105364  4/1997

* cited by examiner

Primary Examiner—Steven O. Douglas
(74) Attorney, Agent, or Firm—McDermott, Will & Emery (57) ABSTRACT

A ventilation-side floating valve 40 is provided for a fuel tank divided into a main tank part and a sub-tank part through a swelling part. The valve 40 includes an upper casing part 41 in which a float 46, a spring 47 and a retainer 48 are accommodated and a lower casing part 42. In arrangement of the valve 40, the upper casing part 41 is arranged on a central-upper part of the fuel tank above the swelling part. The lower casing part 42 is bent avoid the swelling part.

16 Claims, 5 Drawing Sheets

REFUELING CONTROL VALVE AND FUEL TANK DEVICE HAVING THE SAME

BACKGROUND OF THE INVENTION

1. Field of the Invention

The present invention relates to a refueling control valve for controlling a quantity of oil (fuel) in refueling a fuel tank for vehicles, ships, etc. Additionally, the present invention relates to a fuel tank device having the refueling control valve.

2. Description of the Related Art

Japanese Patent Publication (kokai) No. 09-105364 shows a fuel tank of this kind. In this fuel tank, a tank body has a main tank part, a sub-tank part and a swelling part arranged between the main tank part and the sub-tank part to project upwardly. In connection with the arrangement of seat cushions for an automotive rear seat, the tank body is formed so that the main tank and the sub-tank have respective upper faces both lowered in comparison with the upper face of the swelling part.

Due to the structure where the surface of fuel in full charge is separated by the swelling part, this fuel tank cannot provide a space above the fuel surface with a height enough to arrange the earlier ventilation-side floating valve for controlling the refueling operation. That is, the fuel tank constructed above has a problem of impossibility to arrange the above floating valve just above the fuel surface when the tank is under its full-refueled condition.

SUMMARY OF THE INVENTION

Under the above circumstance, it is an object of the present invention to provide a refueling control valve which is capable of increasing the degree of freedom in arranging the refueling control valve in the tank body. According to the invention, the above-mentioned object is accomplished by a refueling control valve for a fuel tank, comprising:

- a casing having a tube-shaped portion, a flange formed on an outer periphery of the tube-shaped portion for attaching to the fuel tank, a communication port positioned in an upper part of the casing and a connection port connected to the communication port; and
- a float movably accommodated in the tube-shaped portion to close or open the communication port,
- wherein the tube-shaped portion has, at a lower end thereof, an open port opening at a fuel surface of the full-refueled fuel tank, and, at a lower part, a bent portion connecting the open port with the communication port, the bent portion being bent so as not to cause stagnation of liquid passing therethrough.

Note, the above refueling control valve of the invention is identical to the ventilation-side floating valve.

With the above-mentioned structure, since the tube-shaped portion has a bent portion, there is no need to establish a position for detecting the fuel surface of the full-refueled fuel tank just below the float. Therefore, it is possible to increase the degree of freedom in arranging the ventilation-side floating valve in the tank body, accomplishing to control the refueling operation against the tank body in spite of its complicated structure.

DESCRIPTION OF THE PREFERRED EMBODIMENT

Referring to accompanying drawings, embodiments of the present invention will be described below.

[1st. Embodiment]

Figure 1:
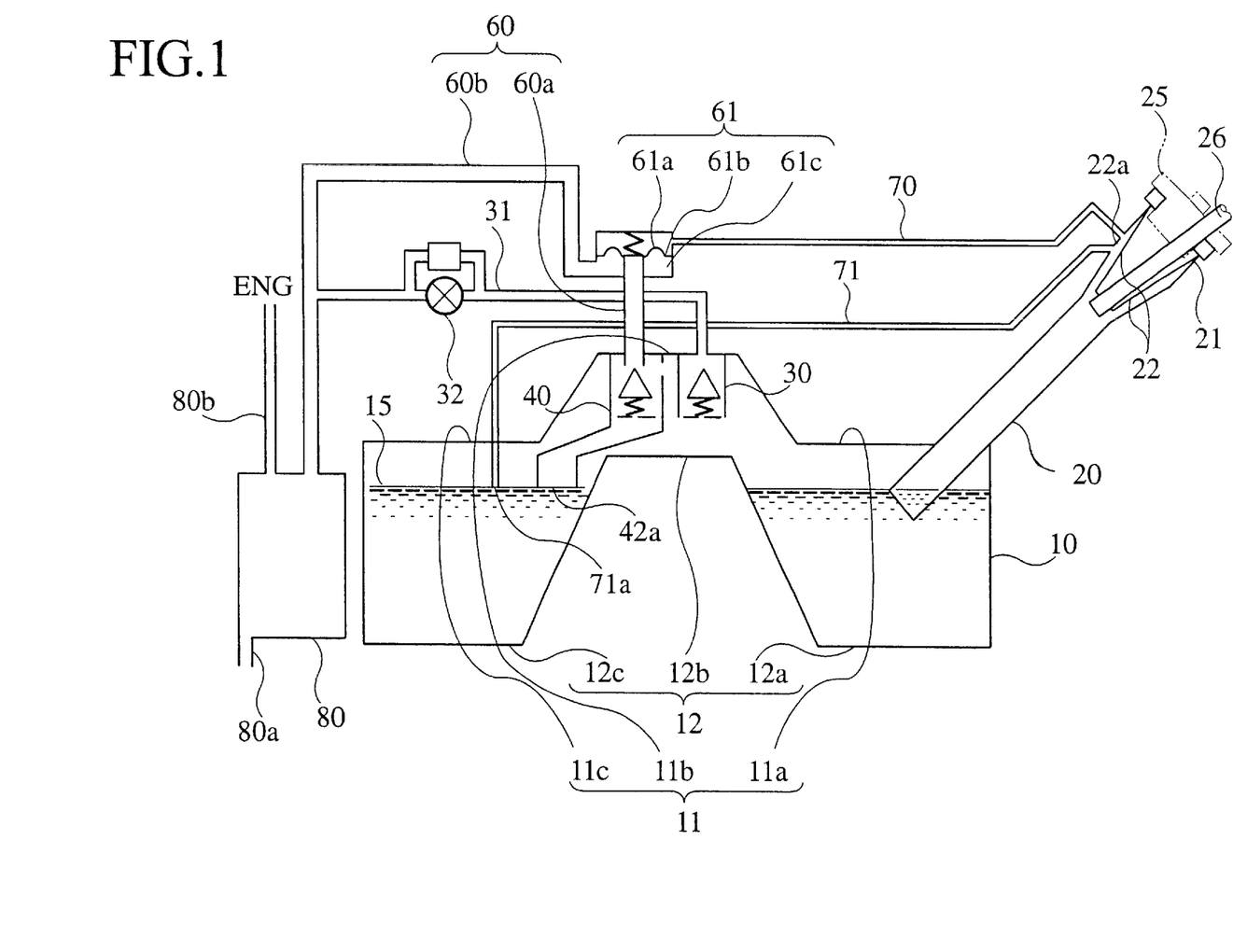
FIG. 1 is a schematic view showing a fuel supply system equipped with a fuel tank device in accordance with the first embodiment of the present invention.
Figure 2:
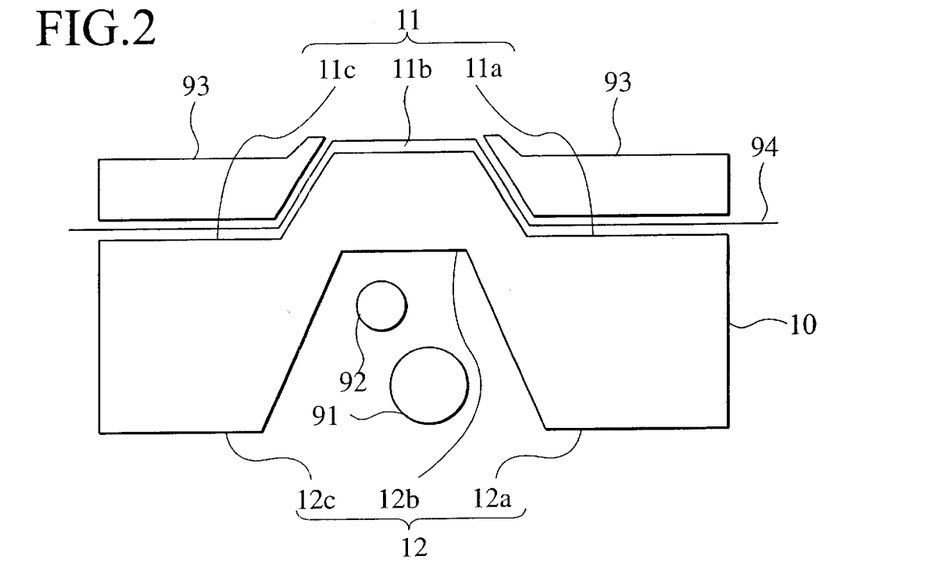
FIG. 2 is a sectional view of a fuel tank body and the environs forming the fuel tank device of the first embodiment of the invention.
Figure 3:
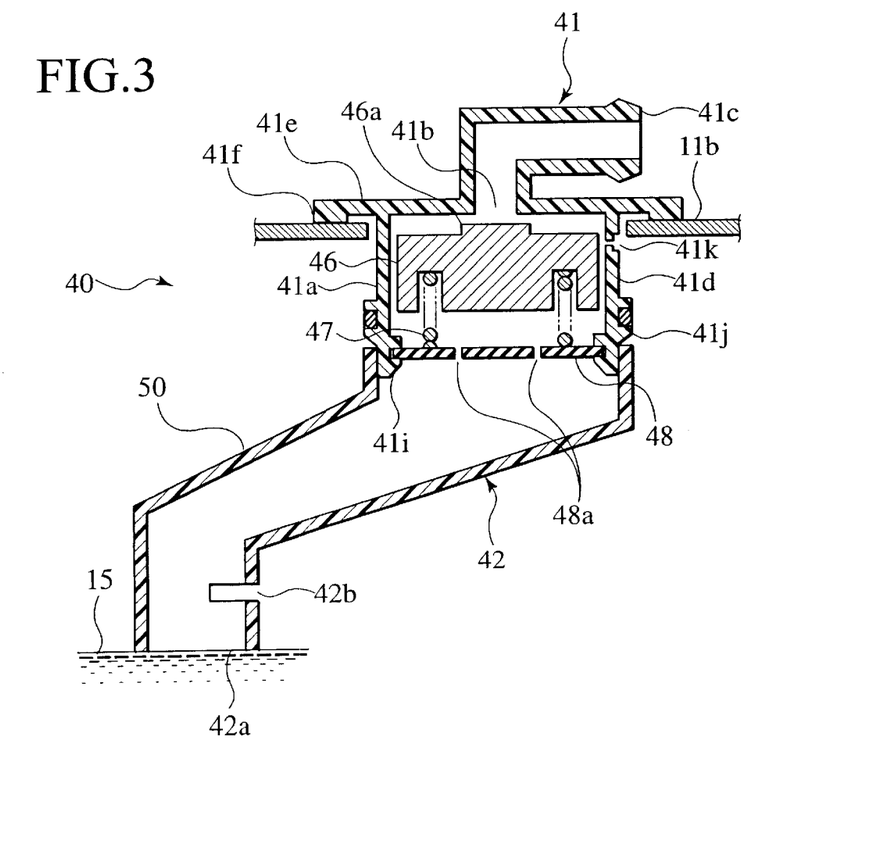
FIG. 3 is a sectional view of a ventilation-side floating valve of the fuel tank device of the first embodiment of the invention.

In the figures, FIGS. 1 to 3 illustrate the first embodiment of the invention. FIG. 1 shows a fuel tank device equipped with the fuel tank of the first embodiment. In FIG. 2, the fuel tank device has a tank body 10 arranged below a floor 94 for rear seats of a vehicle. The tank body 10 is provided with a sideways filler tube 20.

In the vehicle having a propeller shaft 91 and an exhaust pipe 92 both extending in the center of the vehicle body, the tank body 10 has a swelling part 12b formed at the center of a bottom 12 to project upwardly. The tank body 10 further includes a main tank (part) 12a having the above filler tube 20 connected thereto and a sub-tank (part) 12c on the opposite side of the main tank 12a over the swelling part 12b. In connection with the arrangement of seat cushions 93, 93 required for the comfortability of rear seats, which are disposed on an upper face 11 of the fuel body 10 through the floor 94, the tank body 10 is formed so that the main tank 12a and the sub-tank 12c have respective upper faces 11a and 11c both lowered in comparison with an upper face 11b of the swelling part 12b. Therefore, in process of refueling, the fuel being supplied through the filler tube 20 firstly fills the main tank 12a, continuously surmounts the swelling part 12b and finally fills the sub-tank 12c. Noted, it is established that the level of a full-fuel level 15 at the sub-tank 12c is lower than the height of the swelling part 12b.

A refueling port 21 of the filler tube 20 is closed by a filler cap 25 except the refueling operation. In order to introduce a refueling nozzle 26 to an appropriate position at refueling, a guide 22 for the filler tube 20 is arranged in the vicinity of the refueling port 21 to define an air reservoir 22a apart from the refueling port 21.

The left-hand upper face 11c of the tank body 10 is connected with the filler tube 20 through a re-circulation tube 71. The re-circulation tube 71 is arranged so that its leading end on the side of the filler tube 20 opens to the air reservoir 22a defined by the guide 22. While, the re-circulation tube 71 is provided, on the side of the sub-tank 12c, with another end 71a which opens at the height of the full-fuel level 15 of the sub-tank 12c.

On the underside of the upper face 11b of the tank body 10, there are arranged an evaporation-side floating valve 30 and a ventilation-side floating valve 40 as the fuel tank refueling control valve of the invention. The evaporation-side floating valve 30 is connected to a canister 80 through an evaporation-side tube 31 interposing a check valve 32 therein.

On the other hand, the ventilation-side floating valve 40 is also connected to the canister 80 through a ventilation-side tube 60.

As shown in FIG. 3, the ventilation-side floating valve 40 is shaped in the form of a pipe (tube) opening downward and has an upper casing (part) 41 and a lower casing (part) 42 connected to the upper casing part 41, mainly. The upper casing part 41 comprises a cylindrical part (tube-shaped portion) 41a, a communication port 41b formed on one end of the part 41a to communicate the inside of the tank body 10 with the outside, a connection port 41c formed to succeed to the communication port 41b, for connection with the above ventilation-side tube 60, a flange part 41e formed to project from a side face 41d of the cylindrical part 41a laterally and also provided with a welding part 41f for airtight contact with the tank body 10, and an orifice 41k formed under the flange part 41e to communicate the inside of the cylindrical part 41a with the outside. The valve 40 further includes a float 46 accommodated in the upper casing part 41 to have a projection 46a capable of closing the communication port 41b, a spring 47 for bearing the float 46 from its underside, and a retainer 48 fixed on the upper casing part 41 through an integral claw part 41i inside the part 41 to bear the spring 47 from its underside and also provided with one or more holes 48a for passage of vapor to be replaced at refueling. The lower casing part 42 is fixed on the upper casing part 41 through an integral claw part 41j outside the part 41. The lower casing part 42 is provided with a tube-shaped portion having a bent portion 50 which is bent so as not to interrupt the flow of liquid from the lower port of the cylindrical part 41a to the sub-tank 12c. In other words, a cylindrical passage (tube-shaped portion) defined by the lower casing part 42 is offset to a passage (tube-shaped portion) defined by the upper casing part 41 while producing no stagnation of fuel passing through the cylindrical passage. In the vicinity of its lower port 42a on the side of the sub-tank 12c, the lower casing part 42 has a curved horizontal slit 42b formed on the side wall defining the port 42a to communicate the inside of the pipe (tube) with the outside.

The size of the orifice 41k of the upper casing part 41 is determined by the refueling speed of fuel and also supplementary fuel and the velocity of vapor originating in the tank body 10 and subsequently flowing out of the upper and lower casing parts 41, 42. Further, the height of the orifice 41k also depends on the above velocity of vapor flowing out.

When the fuel level reaches a designated height, then the float 46 closes up the communication port 41b. While, when the fuel level is lowered to another designated height, then the float 46 opens the communication port 41b.

The opening area of each hole 48a of the retainer 48 for passage of vapor is determined by the above refueling speed alike.

Similarly to the orifice 41k, the opening area of the slit 42b is determined by the refueling speed of fuel and supplementary fuel and the velocity of vapor originating in the tank body 10 and subsequently flowing out of the upper and lower casing parts 41, 42. Additionally, the opening area of the slit 42b is set to be smaller than the opening area of the open port 42a. The height of the slit 42b is determined on consideration of an amount of the supplementary fuel mentioned later. Furthermore, the position of the slit 42b in the circumferential direction of the lower casing part 42 is determined on consideration of the influence of waves produced on the fuel surface at refueling. In the modification, the horizontal slit 42b may be replaced by a vertical slit or a plurality of orifices (not shown) in the part 42.

The joint between the upper casing part 41 and the lower casing part 42 is superior in air-tightness and therefore, a clearance of the joint is remarkably small in comparison with the opening area of the orifice 41k.

In FIG. 1, a ventilation-side check valve 61 is interposed in the ventilation-side tube 60. The check valve 61 has a first chamber 61a and a second chamber 61c both interposing a diaphragm 61b therebetwen. The first chamber 61a is communicated with the air reservoir 22a by a signal tube 70, while the second chamber 61c is connected with an inflow tube 60a and an outflow tube 60b of the ventilation-side tube 60. With the opening/closing operation of the diaphragm 61b of the ventilation-side check valve 61, the communication of the inflow tube 60a with the outflow tube 60b can be controlled.

The canister 80 is communicated, at an opening 80a thereof, with the atmosphere on one hand. On the other hand, the canister 80 is connected with a not-shown engine through a tube 80b.

When refueling the tank body 10, open the filler cap 25 of the filler tube 20 and insert the refueling nozzle 26 into the refueling port 21 of the filler tube 20 thereby to perform the refueling operation. During this refueling, fuel flows from the filler tube 20 into the tank body 10. Then, vapor generated in the tank body 10 is mostly introduced into the canister 80 through the ventilation-side tube 60.

First, the vapor supply from the tank body 10 to the canister 80 and the operations of the check valve 61 and the floating valve 40 will be described below. While the filler cap 25 is opening, the air reservoir 22a in the vicinity of the refueling port 21 of the tube 20 has the pressure of the atmosphere. With the connection between the first chamber 61a of the check valve 61 and the air reservoir 22a via the signal tube 70, the interior of the first chamber 61a has the pressure of the atmosphere alike. To the contrary, the interior of the tank body 10 has a pressure higher than the pressure of the atmosphere due to the rise in pressure by refueling and also vapor-generation. Additionally, since the second chamber 61c is connected with the tank body 10 through the inflow tube 60a, the interior of the second chamber 61c has a pressure higher than the pressure of the atmosphere.

The difference in pressure between the inside of the first chamber 61a and the inside of the second chamber 61c causes the diaphragm 61b to be moved to open the check valve 61, so that the vapor in the tank body 10 is introduced into the canister 80 through the ventilation-side tube 60. The vapor fed to the canister 80 is discharged into the air via the opening 80a after a fuel component in the vapor has been absorbed by the canister 80. In this way, since the vapor in the tank body 10 is replaced by the fuel fed into the tank body 10, it can be charged with fuel smoothly.

As described before, the fuel being supplied into the tank body 10 firstly fills the main tank 12a. Thereafter, the fuel surmounts the swelling part 12b and finally fills the sub-tank 12c. With a continuation of refueling the tank body 10, when the fuel in the sub-tank 12c reaches the lowermost port 42a of the lower casing part 42, then it is closed up by the fuel.

This means that the vapor in the tank body 10 misses its outflow route. Consequently, the pressure in the tank body 10 is elevated to push the fuel in the lower casing part 42 upwardly. Subsequently, the so-pushed fuel enters into the upper casing part 41 and finally causes the float 46 to move.

Since the communication port 41b is closed by the float 46, the floating valve 40 prevents the vapor from flowing into the canister 80. Consequently, with no replacement to the vapor in the tank body 10, the interior pressure is further elevated to push the fuel into the filler tube 20 upwardly. Thereafter, when the level of fuel in the tube 20 is detected by an automatic stop sensor (not shown) on the refueling nozzle 26, a refueling stop unit on a refueling system (both not shown) having the refueling nozzle 26 connected thereto generates a command to cease the first refueling operation since the filler cap 25 has been opened. This first refueling operation after opening the filler cap 25 will be called as "early refueling" hereinafter.

Noted that the orifice 41k and the slit 42b of the floating valve 40 each has an opening area so that the flowing rate (velocity) of vapor passing therethrough is sufficiently smaller than that of fuel at the early refueling. Thus, the fuel speed at which the fuel rises in the upper casing part 41 and the lower casing part 42 is large in comparison with the vapor speed at which the vapor flows out of the parts 41 and 42.

After a standstill of the early refueling, the vapor in the tank body 10 enters into the upper casing part 41 and also the lower casing part 42 through the orifice 41k and the slit 42b respectively, whereby the fuel in the parts 41, 42 returns into the sub-tank 12c through the open port 42a at the lowermost end of the lower casing part 42a. In this way, since the fuel disappears from the interior of the upper casing part 41, the ventilation-side floating valve 46 is again opened.

Although the open port 42a of the lower casing part 42a is blocked up by the fuel as a result of it returning into the sub-tank 12c, the interior of the tank body 10 is still communicated with the canister 80 through the slit 42b, allowing the flowing-out of vapor in the tank body 10. This means that it is possible to refuel the tank body 10 furthermore. This refueling operation subsequent to the standstill of early refueling will be called as "additional refueling", hereinafter.

Meanwhile, since the opening area of the slit 42b is smaller than that of the opening port of the lower casing part 42 on the side of the sub-tank 12c, there is a limitation in flowing rate (or velocity) of the fuel to be flown out of the part 42 through the slit 42b. Thus, it would be impossible to refuel the tank body 10 unless the flowing rate at the additional refueling is smaller than that at the early refueling. With the additional refueling at a flowing rate smaller than that of the early refueling, the float 46a elevated by the fuel again closes up the communication port 41b thereby to stop the outflow of vapor into the canister 80. Thereafter, this refueling operation is stopped as similar to the above-mentioned refueling standstill action in the early refueling operation. By repeating the operation from the additional refueling up to its standstill action by several times, the slit 42b finally sinks into the fuel to cause the impossibility of additional refueling, so that the refueling operation is completed.

In the establishment, the flowing rate of vapor passing through the orifice 41k of the valve 40 is sufficiently small in comparison with the flowing rate of fuel at the additional refueling. Accordingly, at the additional refueling, the fuel rising in the upper casing part 41 and the lower casing part 42 has a speed larger than the flowing rate of vapor flowing out of the parts 41, 42.

After completing the additional refueling operation, as the vapor in the tank body 10 flows into the upper casing part 41 through the orifice 41k, the fuel in the upper casing part 41 is then returned into the sub-tank 12c, so that the float 46 appears out of the fuel.

After completing the whole refueling operation, the refueling nozzle 26 is withdrawn out of the refueling port 20 of the filler tube 20 and continuously, the filler cap 25 is fitted to the port 20. This operation causes the pressure in the air reservoir 22a to rise from the atmospheric pressure to the inside pressure of the tank body 10. Correspondingly, through the intermediary of the signal tube 70, the pressure in the first chamber 61a of the ventilation-side check valve 61 is also elevated from the atmospheric pressure to the inside pressure of the tank body 10. Thus, since the first chamber 61a has an inside pressure equal to that of second chamber 61c, the check valve 61 is closed up by the action of the diaphragm 61b. In this way, the ventilation-side tube 60 is blocked up on the vapor's way to the canister 80 from the tank body 10.

Next, the vapor circulation using the re-circulation tube 71 will be described below. It should be noted that the leading end 71a of the tube 71 connection the sub-tank 12c with the air reservoir 22a is the same height as the lowermost end (open port) 41a of the lower casing part 42. Therefore, until the tank body 10 is filled up with fuel, the vapor generated in the tank body 10 is introduced into the air reservoir 22a through the re-circulation tube 71 and subsequently caught by the fuel during the refueling operation, into the tank body 10 again.

By the same reason, since the vapor generated in the body 10 after the early refueling operation has been stopped is not introduced into the air reservoir 22a in the filler tube 20, the replacement of vapor is prohibited to progress the standstill of refueling operation certainly.

Noted, the inner diameters of the re-circulation tube 71 and the ventilation-side tube 60 are respectively established by consideration of an amount of vapor produced at refueling and also an amount of gas dragged into the fuel at the refueling port 21 of the tube 20. Additionally, such a formation of the tubes 71, 60 may be replaced with the control of the orifice in number and size.

Next, the operations of the evaporation-side check valve 32 and the same-side floating valve 30 will be described below. In establishment, the pressure to open the check valve 32 is higher than a differential pressure between the first chamber 61a and the second chamber 61c of the check valve 61 at refueling. Therefore, during the refueling operation, the check valve 32 is closed up. When the filler tube 20 is closed up by the filler cap 25, then there is not produced a differential pressure between the chambers 61a and 61c, so that the valve 61 occupies its closing position and would not open in spite of the inside pressure of the tank body 10 being elevated. Nevertheless, if the inside pressure of the tank body 10 rises up to a designated pressure, then the evaporation-side check valve 32 opens to introduce the vapor generated in the tank body 10 into the canister 80 via the tube 31.

[2nd. Embodiment]

Figure 4:
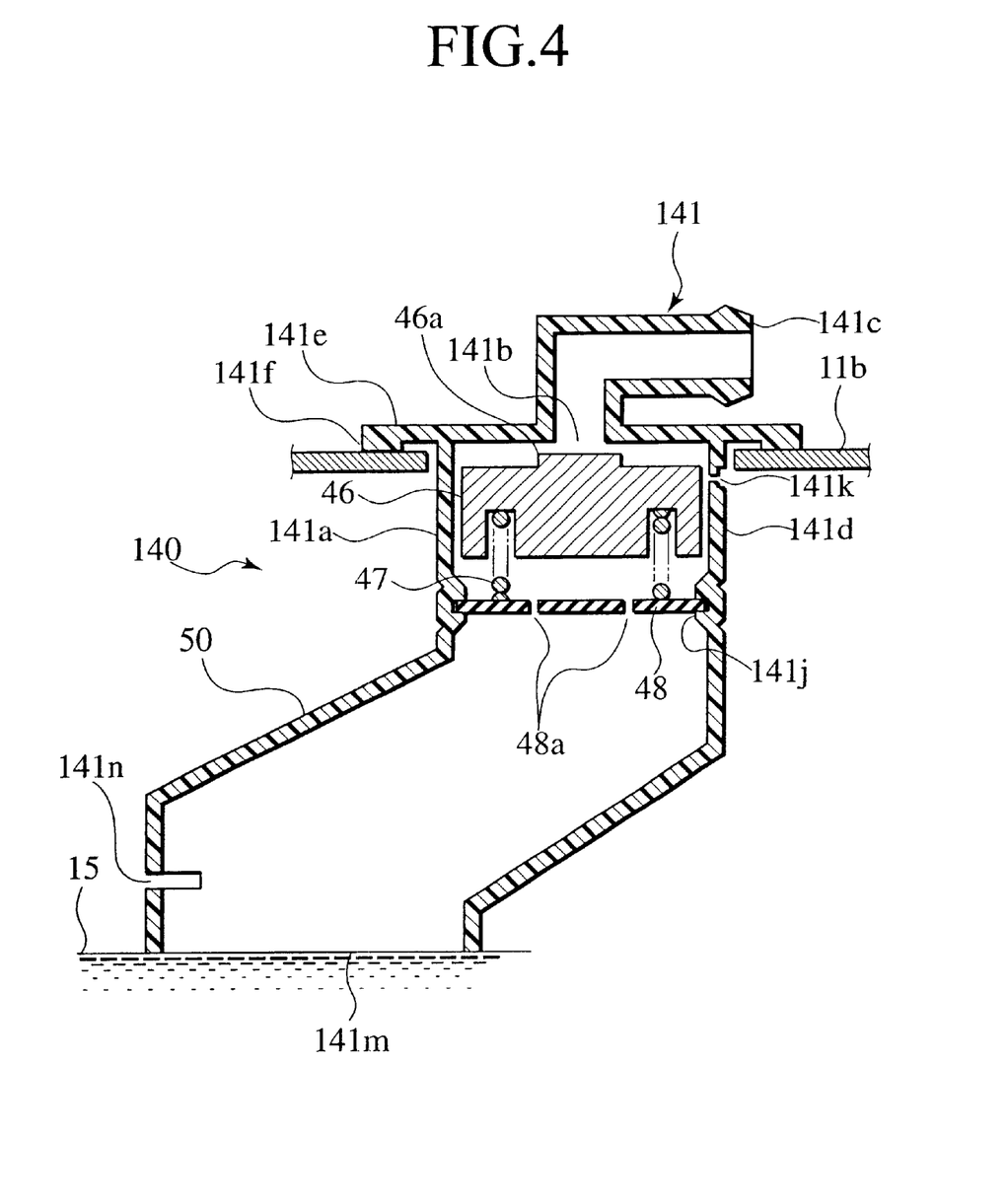
FIG. 4 is a sectional view of the ventilation-side floating valve of the fuel tank device, in accordance with the second embodiment of the invention.

FIG. 4 shows a floating valve of the second embodiment, which is different from the floating valve 40 of the first embodiment of the invention. The ventilation-side floating valve 140 of the second embodiment has a single casing 141 (unity body) in place of the upper casing part 41 and the lower casing part 42 of the previous embodiment. Note, in this embodiment, elements identical to those of the first embodiment will be indicated with the same reference numerals, respectively.

In the ventilation-side floating valve 140 of FIG. 4, the casing 141 comprises a cylindrical part (tube-shaped portion) 141a, a communication port 141b formed on one end of the part 141a to communicate the inside of the tank body 10 with the outside, a connection port 141c formed to succeed to the communication port 141b, for connection with the above ventilation-side tube 60, a flange part 141e formed to project from a side face 141d of the cylindrical part 141a laterally and also provided with a welding part 141f for airtight contact with the tank body 10, and an orifice 141k formed under the flange part 141e to communicate the inside of the cylindrical part 141a with the outside. In the vicinity of its lower port 141m on the side of the sub-tank 12c, the casing part 141 further includes a curved horizontal slit 141n formed to communicate the inside of the cylindrical part 141a with the outside.

Similarly, the valve 140 further includes the float 46 having the projection 46a capable of closing the communication port 141b, the spring 47 for bearing the float 46 from its underside, and the retainer 48 fixed on the casing 141 through an inside claw part 141i to bear the spring 47 from its underside. Note, the operations of the orifice 141k and the slit 141n are similar to those of the previously-mentioned orifice 41k and the slit 42b, respectively.

As of the blow molding of the casing 141, the inside claw part 141i is not formed on the inner face of the casing 141 simultaneously. In order to form the above claw part 141i, it is firstly executed, after positioning the float 46 and the spring 47 in the so-molded casing 141, to dispose the retainer 48 in position of the casing 141 by means of a positioning tool etc. Upon completion of the positioning of the margin of the retainer 48, the casing 141 is hot-crimped to fix the retainer 48 in the casing 141, providing the inside claw part 141i. Additionally, the casing 141 and the open port 141m are both shaped with dimensions allowing the float 46, the spring 47 and the retainer 48 to be inserted into the casing 141 and also arranged in their designated positions respectively.

[3rd. Embodiment]

Figure 5:
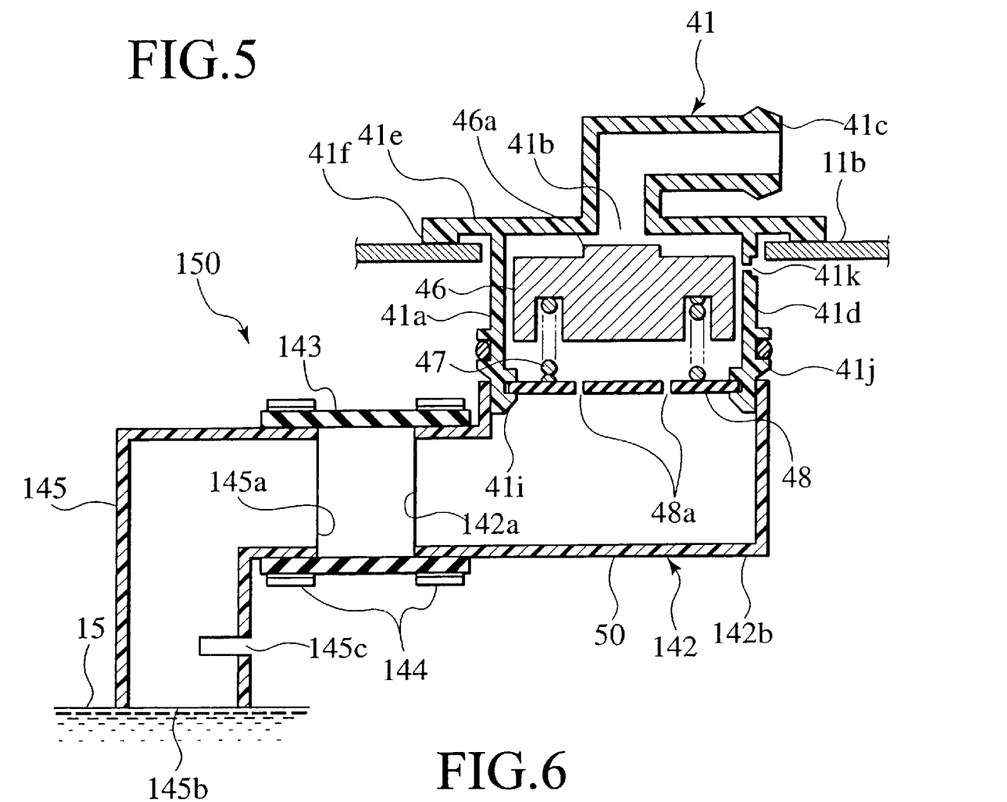
FIG. 5 is a sectional view of the ventilation-side floating valve of the fuel tank device, in accordance with the third embodiment of the invention.

FIG. 5 shows a floating valve of the third embodiment, which is different from the floating valve 40 of the first embodiment of the invention. The ventilation-side floating valve 150 of the third embodiment has two casing elements in place of the lower casing part 42 of the first embodiment. Note, in this embodiment, elements identical to those of the first embodiment will be indicated with the same reference numerals respectively and therefore, their overlapping descriptions will be eliminated.

The ventilation-side floating valve 150 of the third embodiment has the upper casing part 41, the float 46, the spring 47, the retainer 48, a lower casing part 142 retained by the claw part 41i of the upper casing part 41 and has an upper tube-shaped portion 142b having a connection port 142a. A connecting tube 143 connects the connection port 142a and a connection port 145a of a lower tube-shaped portion 145. The upper tube-shaped portion and the lower tube-shaped portion 145 are bent, and these upper tube shaped portion and lower tube shaped portion and the connecting tube 143 constitute a bent portion 50. The lower tube-shaped portion 145 is also provided, at the lowermost end, with an open port 145b corresponding to the open port 42a of the first embodiment. In the vicinity of the open port 145b, the opening casing part 145 has a horizontal slit 145c formed to communicate the inside of the cylindrical body with the outside.

The operation of the slit 145c is similar to that of the slit 42b of the first embodiment.

This lower casing part 142 (i.e. the upper tube-shaped portion 142b, the tube 143 and the upper tube-shaped portion 145) are arranged so as not to interrupt the current of liquid flowing from the connection of the part 142 with the upper casing part 41 to the open port 145b. In case of the tube 143 being long, the tube 143 and the opening casing part 145 may be connected with the tank body 10 through not-shown brackets etc. in order to determine the position of the tube 143.

In case of the tube 143 from a rubber hose, its connection with the part 142 and the part 145 may be assisted by clamps 144. Alternatively, the tube 143 of nylon (trade mark) may be pressure-fitted to the lower casing part 142 and the opening casing part 145 alike. Note, the inner diameter of the tube 143 is determined by an amount of vapor generated from the tank body 10.

[4th. Embodiment]

Figure 6:
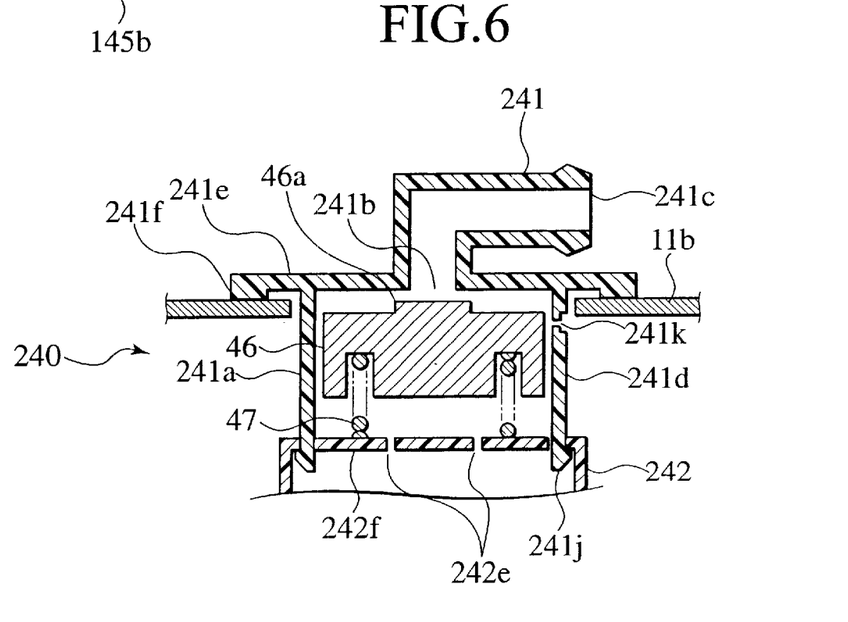
FIG. 6 is a sectional view of the ventilation-side floating valve of the fuel tank device, in accordance with the fourth embodiment of the invention.

FIG. 6 shows the fourth embodiment where the spring 47 supported by another element different from the above retainer 48. According to the embodiment, a ventilation-side floating valve 240 comprises an upper casing part 241 and a lower casing part 242. Similar to the upper casing part 41 FIG. 3, the upper casing part 241 has a cylindrical part 241a, a communication port 241b for communicating the inside of the tank body 10 with the outside, a connection port 241c for connection with the ventilation-side tube (not shown), a flange part 241e and an orifice 241k for communicating the inside of the cylindrical part 241a with the outside. The upper casing part 241 is further provided, on the lower end of the cylindrical part 241a, with a claw part 241j for connection with the lower casing part 242. The lower casing part 242 is provided, on an upper end thereof, with a support part 242f corresponding to the previous retainer 48 to support the spring 47 from the underside. According to this embodiment, with the removal of the retainer 48, it is possible to reduce the number of constituents of the ventilation-side valve in comparison with the first embodiment, accomplishing a saving in its manufacturing cost.

The other constitution of the valve 240 is similar to that in the first or third embodiment and therefore, the overlapping descriptions are eliminated.

[5th. Embodiment]

Figure 7A:
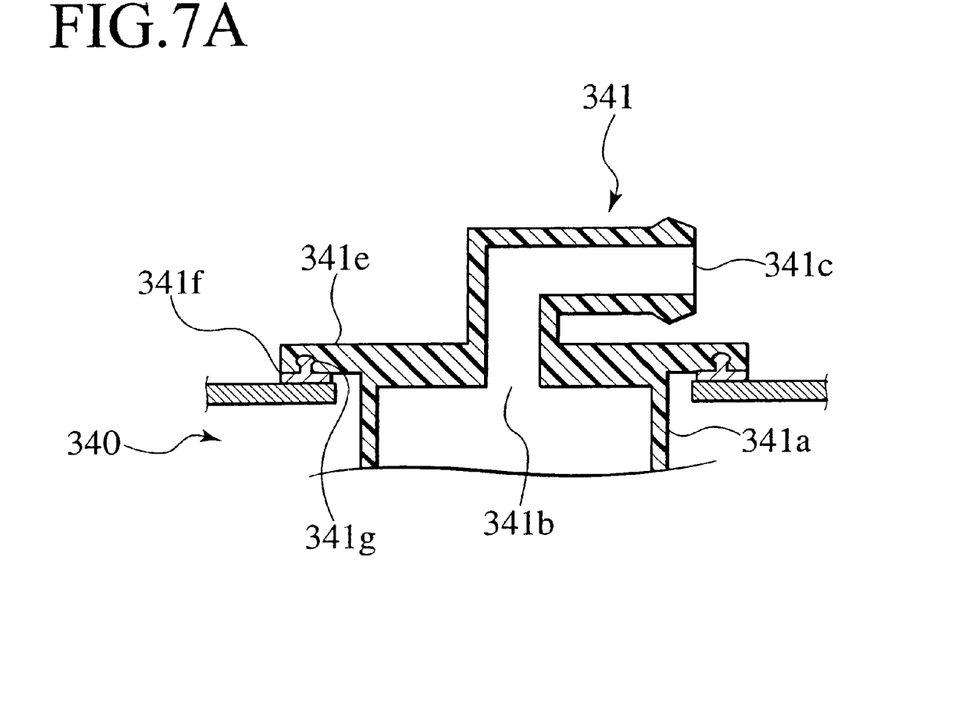
FIG. 7A is a sectional view showing a flange part of the ventilation-side floating valve in accordance with the fifth embodiment of the invention.
Figure 7B:
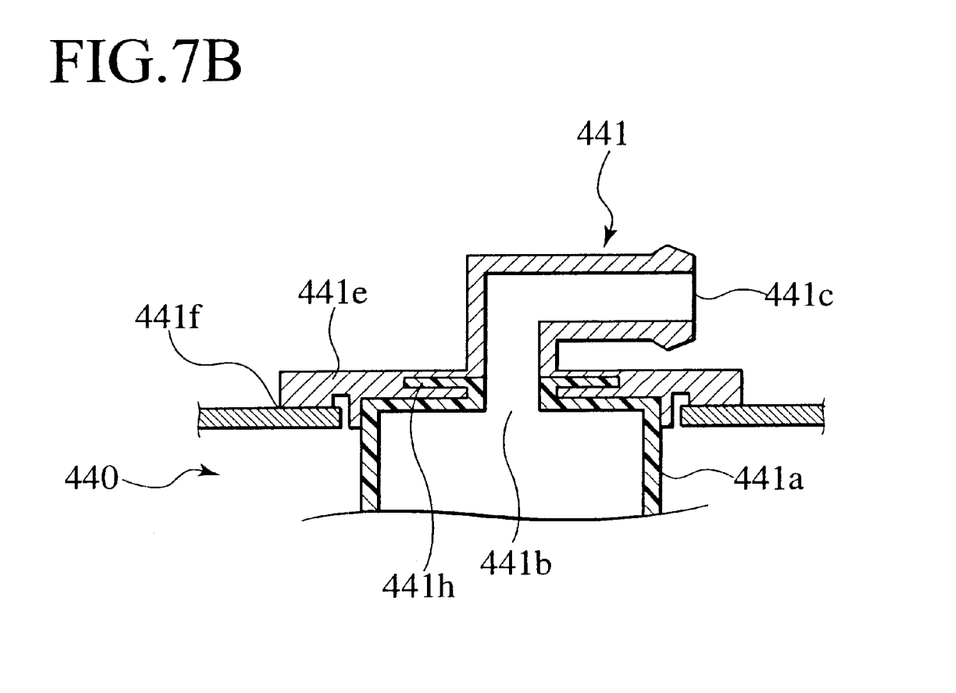
FIG. 7B is a sectional view showing another form of the flange part of the ventilation-side floating valve of the fifth embodiment.

FIGS. 7A and 7B show two modifications of the upper casing part 41 of the first embodiment. In case of forming the tank body 10 of resinous material, it is general to employ HDPE (high density polyethylene) in view of its formability and material cost. Additionally, the tank body 10 of HDPE is normally coated with nylon or fluorine membrane of low fuel-permeability for purpose of the prevention of atmospheric pollution with the reduction of fuel permeation.

Further, it should be noted that the communication port (e.g. 341b of FIG. 7A) of the upper casing part of the ventilation-side floating valve is required to have sufficient air-tightness against the elevated float and therefore, it is necessary to form the communication port with a predetermined surface accuracy. Additionally, with the requirements of both superior fuel-resistance and reduced fuel-permeation, POM (polyacetal) is generally employed as material for the upper casing part.

However, it is difficult to weld the above-mentioned materials (HDPE, POM) with each other from the nature of material. Under such a situation, we now provide the fifth embodiment to employ two kinds of materials for the upper casing part of the ventilation-side floating valve.

In one ventilation-side floating valve 340 of FIG. 7A, an upper casing part 341 is made from the above POM material except a welding part 341f in contact with the tank body 10. The welding part 341f is made of resinous material of low permeability, such as alloy of EVOH/PE and alloy of POM/PE, which is capable of welding to the tank body 10 of HDPE. Additionally, the part 341f is provided, on its face in contact with a flange part 341e of the part 341, with a projection 341g which serves to enhance the connection of the welding part 341f with the flange part 341e in the insert-molding of the upper casing part 341.

In another ventilation-side floating valve 440 of FIG. 7B, an upper cylindrical part 441a including a communication port 441b is made from the material POM, while an upper casing part 441 in connection with the part 441a is made of resinous material of low permeability, which is capable of welding to the tank body 10 of HDPE. Further, the upper cylindrical part 441a is provided, above the communication port 441b, with a flange 441h which serves to enhance the connection of the upper casing part 441 with a flange part 441e in the insert-molding of the upper cylindrical part 441a.

In the modification, in case of the tank body 10 of metal, the flange part 41e (FIG. 3) of the upper casing part 41 may be provided with a not-shown claw part which allows the part 41 to be assembled to the tank body 10 through a bracket (also not shown) assembled thereto in advance.

The entire contents of Japanese Patent Application No. P2000-192876 is incorporated herein by reference.

The scope of the invention is defined with reference to the following claims.

What is claimed is:

1. A refueling control valve for a fuel tank, comprising:
   a casing having a tube-shaped portion, a flange formed on an outer periphery of the tube-shaped portion adapted for attachment to a fuel tank, a communication port positioned in an upper part of the casing and a connection port connected to the communication port; and
   a float movably accommodated in the tube-shaped portion to close or open the communication port,
   wherein the tube-shaped portion has a lower end adapted to be inserted into a fuel tank and comprising an open port and a lower part comprising a bent portion connecting the lower-end open port with the communication port, the bent portion being bent so as not to cause stagnation of liquid passing therethrough,
   wherein the tube-shaped portion further comprises, in the vicinity of the open port at the tube-shaped portion lower end, a communication part configured to permit communication between an inside of the casing tube-shaped portion and an inside of a fuel tank.

2. The refueling control valve of claim 1, wherein the casing comprises:
   an upper casing part accommodating the float therein; and
   a lower casing part connected to the upper casing part, having the bent portion.

3. The refueling control valve of claim 1, wherein the upper casing part and the lower casing part are formed in a unity body.

4. The refueling control valve of claim 1, wherein the casing is provided, on its side face below the flange, with an orifice for communicating the inside of the casing with the outside.

5. The refueling control valve of claim 1, wherein the flange is provided with an attaching part to be attached to an object, the attaching part being made of material having a low permeability to fuel and a superior welding capability with the object, and the casing's part including the communication port is made of material having superior air-tightness.

6. A refueling control valve according to claim 1, wherein the communication port is connected to a canister through a check valve.

7. A refueling control valve according to claim 1, wherein the communication part is smaller in cross-sectional area than the open port.

8. A refueling control valve according to claim 1, wherein the communication part is adapted to open directly to an inside of a fuel tank.

9. A refueling control valve according to claim 1, wherein the communication part comprises at least one of a slit and a plurality of orifices.

10. A refueling control valve according to claim 1, wherein the bent portion of the tube-shaped portion is adapted to be inserted into a fuel tank.

11. A fuel tank device comprising:
    a fuel tank for storing a fuel;
    a filler tube for refueling the fuel tank; and
    a fuel tank refueling control valve mounted on the fuel tank,
    wherein the fuel tank refueling control valve includes:
       a casing having a tube-shaped portion, a flange formed on an outer periphery of the tube-shaped portion adapted for attachment to the fuel tank, a communication port positioned in an upper part of the casing and a connection port connected to the communication port; and
       a float movably accommodated in the tube-shaped portion to close or open the communication port,
    wherein the tube-shaped portion has a lower end comprising an open port inserted into the fuel tank and a lower part comprising a bent portion connecting the open port with the communication port, the bent portion being bent so as not to cause stagnation of liquid passing therethrough,
    wherein the tube-shaped portion further comprises, in the vicinity of the open port, a communication part configured to permit communication between an inside of a portion of the casing inserted into the fuel tank and an inside of the fuel tank.

12. A fuel tank device according to claim 11, wherein the communication part is smaller in cross-sectional area than the open port.

13. A fuel tank device according to claim 11, wherein the communication part is opens directly to an inside of a fuel tank.

14. A fuel tank device according to claim 11, wherein the fuel tank for storing a fuel comprises a swelling part and wherein the refueling control valve is mounted to the swelling part.

15. A fuel tank device according to claim 11, wherein the communication part comprises at least one of a slit and a plurality of orifices.

16. A fuel tank device according to claim 11, wherein the bent portion of the tube-shaped portion is disposed within the fuel tank.

* * * * *